United States Patent [19]
Bey et al.

[11] 3,856,413
[45] Dec. 24, 1974

[54] PHOTOGRAPHIC COLOR DENSITOMETER

[76] Inventors: Paul P. Bey; Michael P. Bey, both of 4909 Abbott Dr., Temple Hills, Md. 20031

[22] Filed: Jan. 18, 1973

[21] Appl. No.: 324,664

[52] U.S. Cl. ............... 356/175, 356/186, 356/188, 356/202, 356/226
[51] Int. Cl. .......................................... G01j 3/50
[58] Field of Search.... 356/175, 186, 188, 201–203, 356/226–228

[56] References Cited
UNITED STATES PATENTS

| | | | |
|---|---|---|---|
| 3,663,110 | 5/1972 | Rising | 356/203 |
| 3,704,950 | 12/1972 | Rosencranz | 356/202 X |
| 3,744,919 | 7/1973 | Babb | 356/186 X |

*Primary Examiner*—Ronald L. Wibert
*Assistant Examiner*—F. L. Evans

[57] ABSTRACT

A photometric device for measuring the differences in primary color optical densities between spectrally neutral areas of a standard photographic color negative and a color negative to be printed and for measuring the exposure time for the negative to be printed. The density measurements determine the densities of proper color compensating filters required for photographic color printing. Memory voltages are provided which are proportional to the intensities of the primary colors transmitted through a spectrally neutral area of a standard color negative and standard filter pack. Light, transmitted through a spectrally neutral area of a color negative to be printed and sequentially selected primary color filters, is incident on a photodetector. The resulting photocurrents sequentially generate voltages at the output of an operational amplifier which are proportional to the photocurrents and gain of the amplifier. A potentiometer, connected to the operational amplifier, determines its gain and is adjusted for each of the primary colors so that the voltage developed at the output of the operational amplifier is equal to the corresponding memory voltage as indicated by a null detector. The potentiometer is calibrated to read optical density and indicates the proper filter compensation for the photographic color negative to be printed.

A memory voltage is also provided which is proportional to the intensity of white light transmitted through a highlight of a standard color negative and standard filter pack. White light transmitted through a highlight of a color negative to be printed and compensating filters is incident on the photodetector. The resulting photocurrent generates a voltage at the output of the aforementioned operational amplifier. The potentiometer connected to the operational amplifier determines its gain and is adjusted so that the output voltage is equal to the memory voltage. The potentiometer is calibrated to read exposure time and indicates the exposure time and indicates the exposure time for the negative to be printed.

21 Claims, 2 Drawing Figures

PHOTOGRAPHIC COLOR DENSITOMETER

BACKGROUND OF THE INVENTION

The present invention relates to a photometric device, and specifically to one which provides means for accurately and rapidly measuring the exposure time and optical density of color compensating filters required for obtaining a color balance of a photographic color negative to be printed. The major drawback in the prior art has been that most devices for photographic color printing utilize ammeters and the like to indicated optical densities and exposure time. Meter drift introduces uncertainty as well as time delay in measurements. In addition, the cost of manufacture is higher since an accurate, expensive meter is required to obtain the necessary accuracy of measurement.

Considering the drawbacks of the prior art, we have developed an economical instrument capable of accurately and rapidly measuring the optical densities of color compensating filters required to obtain a color balance and exposure time for a photographic color negative to be printed by utilizing among other things, memory voltages, voltages developed at the output of an operational amplifier proportional to light intensity incident on a photodetector, a calibrated potentiometer connected to the operational amplifier, a voltage comparator and null detector.

SUMMARY OF THE INVENTION

Primary components of white light transmitted through a spectrally neutral area of a photographic color negative are sequentially selected by optical filters. The filtered light is incident on the cathode of a photodetector and the photocurrents corresponding to the three primary colors, after amplification by a voltage amplifier and a first, second and third operational amplifier, generate voltages at the output of the second operational amplifier proportional to the intensity of light incident on the photodetector. The gain of a third operational amplifier is sequentially varied by switching in memory resistors corresponding to the primary colors. The voltages developed at the output of the third operational amplifier and a reference voltage are applied to the input of a voltage comparator, the output of which is applied to a null detector. The null indication establishes a memory voltage at the output of the second operational amplifier.

To calibrate the device for density measurements, a standard color negative and filter pack are chosen. The red filter and corresponding memory resistor are selected, the second operational amplifier switched to unity gain and the sensitivity adjusted by means of a sensitivity control associated with the first operational amplifier for a null indication. The memory resistors corresponding to the green and blue components of light are adjusted to obtain a null indication with the gain of the second operational amplifier adjusted to unity gain by means of a calibrated potentiometer. Thus, the memory voltages at the output of the second operational amplifier corresponding to the null indications are proportional to the intensities of light for the primary colors transmitted through the standard filter pack and spectrally neutral area of the standard photographic color negative.

To determine the color compensation for a color negative to be printed, the negative is inserted in the negative holder and the compensating filters are removed. The red color selecting filter and corresponding memory resistor are selected. The red component of white light transmitted through a spectrally neutral area of the color negative is incident on the photodetector cathode. The sensitivity control or enlarger aperture is adjusted so that the voltage developed by the photodetector current at the output of the second operational amplifier switched to unity gain is equal to the memory voltage as indicated by the null detector. Green and blue filters and corresponding memory resistors are then selected and the gain of the second operational amplifier is adjusted by the calibrated potentiometer until a null indication is observed. The density scale of the calibrated potentiometer is calibrated to reard optical density and the density indications correspond to the optical density of color compensating filters required to be added or subtracted in order to obtain a color balance of the color negative to be printed.

To determine the exposure time, the light transmitted through a highlight of a photographic color negative and filter pack is incident on the photodetector. The photodetector currents, after amplification by the voltage amplifier and the first and second operational amplifiers generate a voltage at the output of the second operational amplifier which is proportional to the light intensity incident on the photodetector. This voltage is applied to the input of the third operational amplifier, the output voltage of which along with a reference voltage are applied to the input of a voltage comparator. The voltage developed by the voltage comparator is applied to the input of a null detector.

To calibrate the device for exposure measurements, a standard color negative and filter pack are chosen, the calibrated potentiometer scale set to read the correct exposure time and the gain of the third operational amplifier adjusted by the exposure memory resistor until a null indication is obtained by the null detector.

To determine the exposure time for a color negative to be printed, the compensating filters are inserted. Light transmitted through the filter pack and highlight of the color negative is incident on the photodetector. The calibrated potentiometer is adjusted for a null indication by the null detector so that the output voltage of the second operational amplifier is equal to the exposure memory voltage. The exposure time is indicated on the exposure scale of the calibrated potentiometer.

OBJECTS OF THE INVENTION

It is therefore an object of the present invention to detect and indicate differences in optical density between a photographic color negative to be printed and a selected photographic color negative for the primary colors.

A further object of the present invention is to determine density differences between a photographic color negative to be printed and a standard photographic color negative without regard to the specific value of their individual densities.

Another object of the invention is to store relative resistive values proportional to the relative intensities of the primary colors transmitted through a standard filter pack and a spectrally neutral area of a standard photographic color negative.

Another object of the invention is to provide density difference information as a ratio so that parameters such as photodector sensitivity, memory voltage and light intensity do not affect the ratio.

A further object of the invention is to provide means for determining the exposure time for a color negative to be printed.

Other objects and advantages will become readily apparent to those skilled in the art after an understanding of this specification and the accompanying drawings.

DRAWINGS

DETAILED DESCRIPTION

Figure 1:
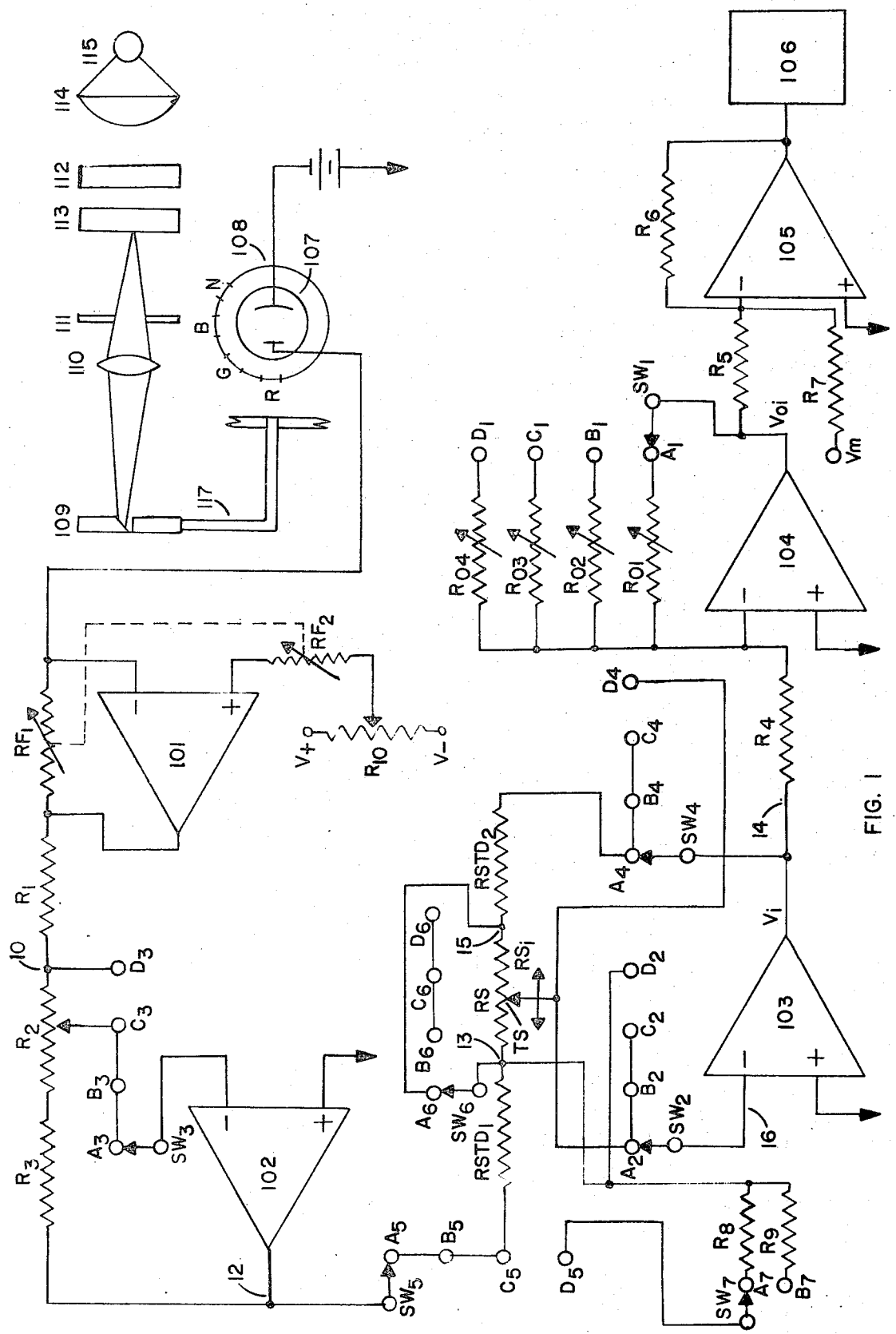
FIG. 1 is a schematic circuit diagram illustrating the photographic color densitometer of the present invention.

Referring to FIG. 1, there is shown a white light source 115 which is used for reproducing a color negative. A plurality of optical elements including: a condenser lens 114; a filter pack drawer 112; a negative holder 113; an adjustable aperture 111; an objective lens 110; a light probe 109; a light guide 117; and a cylindrical filter wheel 108 are serially disposed in the optical path between light source 115 and a photodetector 107 mounted within said filter wheel. Cylindrical filter wheel 108 is provided with a plurality of filter windows, which in a preferred embodiment include a red filter, R, a green filter, G, a blue filter, B, and a neutral filter, N. These filters may be selectively adjusted into optical alignment with photodetector 107, as desired. For reasons that will become more fully apparent hereinafter, the adjustment means of cylindrical filter wheel 108 is coupled or ganged to the shaft of a ganged selector switch comprising sections SW1–SW6 which selectively switches in resistors $R_{01}$, $R_{02}$, $R_{03}$, and $R_{04}$ as filters R, G, B and N, respectively, are selectively aligned with photodetector 107.

Light probe 109 and light guide 117 provide a simple and efficient means for monitoring the optical path of a standard photographic color printer. Light probe 109 may be any suitable type of light guide known in the art or may simply be a planar mirror for reflecting the light from source 115 at right angles to the optical path of the color printer. The light probe 109 may be inserted into the optical path of the color printer prior to the inception of the printing process in order to perform tests to be described hereinafter and may then be removed from the optical path of the printer, when a color print is being made. The light probe 109 may be coupled to any suitable light guide 117, such as a fiber optics bundle.

A detection or measuring circuit, including a voltage generator and three operational amplifiers, is coupled to the output of photodetector 107. The output of photodetector 107 is directly coupled to the input of a voltage generator, which generates a voltage proportional to the current generated by photodetector 107. Generator 101 is provided with a feedback resistor $RF_1$, as is well known in the art, and the voltage across $R_{10}$ is adjusted to cancel the effect of photodetector dark current and $RF_2$ in the noninverting input minimizes the effect of offset bias current temperature shift.

The output of voltage generator 101 is connected to the input circuit of an operational amplifier 102 through first and second voltage divider networks in the feedback path of amplifier 102. Said first and second voltage divider networks may be selectively connected into the circuit with operational amplifier 102 by selector switch section $SW_3$. Said first voltage divider network includes two fixed resistors and a variable resistor or potentiometer for adjusting the sensitivity or gain of operational amplifier 102. The first path includes fixed resistor $R_1$, potentiometer $R_2$ and fixed resistor $R_3$ connected in series between the output of voltage generator 101 at junction 10 and the output of operational amplifier 102 at junction 12. A second path includes a fixed resistor $R_1$, the fixed end resistance of potentiometer $R_2$, and fixed resistor $R_3$ in series between junctions 10 and 12. Potentiometer $R_2$ in said first path is provided with an adjustable tap $T_2$, which is connected to terminal $A_3$ of switch section $SW_3$, and the end resistance of potentiometer $R_2$ is connected to terminals $B_3$, $C_3$, $D_3$ of switch section $SW_3$. Accordingly, depending on the position of switch section $SW_3$, the output of voltage generator 101 is applied to the input of operational amplifier 102 from junction 10 either through fixed resistor $R_1$, potentiometer tap $T_2$ and switch terminal $A_3$ or through fixed resistor $R_1$, end resistance of potentiometer $R_2$ and terminal $B_3$, $C_3$, and $D_3$. Therefore, switch section $SW_3$ and the two associated resistance paths including tap $T_2$ of potentiometer $R_2$ or end resistance of $R_2$, respectively, provide either a sensitivity adjustment or fixed gain of operational amplifier 102.

The output of operational amplifier 102 is connected to the input of an operational amplifier 103 through a second voltage divider network in the feedback path of operational amplifier 103. Said second voltage divider network between junctions 12 and 14 alternatively comprises: (1) two resistors $RSTD_1$ and $RSTD_2$ each of equal value connected in series, wherein $RSTD_1$ is the input resistor and $RSTD_2$ is the feedback resistor of operational amplifier 103, (2) three series connected resistors including an adjustable potentiometer RS and resistors $RSTD_1$ and $RSTD_2$, wherein $RSTD_1$ in series with the resistance of potentiometer RS between junction 13 and tap TS comprises the input resistor to operational amplifier 103 and $RSTD_2$ in series with the resistance of potentiometer RS between tap TS and junction 15 comprises the feedback resistor of operational amplifier 103, and (3) series connected resistors $R_8$ or $R_9$ selected by switch $SW_7$ and resistance of potentiometer RS between junction 13 and tap TS. Resistor $R_8$ or $R_9$ comprises the input resistor and the potentiometer resistance from junction 13 to tap TS comprises the feedback resistor of operational amplifier 103.

Switch sections $SW_1$ through $SW_6$ are ganged with positions or terminals designated as A, B, C and D.

Switch section $SW_2$ is connected to input 16 of amplifier 103 and has the four positions or terminals $A_2$, $B_2$, $C_2$ and $D_2$. Terminals $A_2$, $B_2$, and $C_2$ are connected to potentiometer RS through tap TS. Terminal $D_2$ is connected to junction 13 between $RSTD_1$ and potentiometer RS.

Switch section $SW_4$ has four terminals or positions $A_4$, $B_4$, $C_4$ and $D_4$. Terminals $A_4$, $B_4$ and $C_4$ are connected to junction 14 through resistor $R_4$ to the input of operational amplifier 104 to be described hereinafter. Terminal $D_4$ is connected to potentiometer RS through tap TS.

Switch section $SW_5$ selects the input resistor to operational amplifier 103 and has terminals $A_5$, $B_5$, $C_5$ and $D_5$. Terminals $A_5$, $B_5$ and $C_5$ are connected to $RSTD_1$ and terminal $D_5$ is connected to the pole of switch $SW_7$ which selects either input resistor $R_8$ or $R_9$.

Switch section $SW_6$ has positions $A_6$, $B_6$, $C_6$ and $D_6$. In position $A_6$, junction point 13 is connected to 15. Positions $B_6$, $C_6$, and $D_6$ are open.

With ganged switch sections $SW_1$ through $SW_6$ in first position connected to terminals designated as $A_1$ through $A_6$, operational amplifier 103 is provided with a feedback through $RSTD_2$. In this position $RSTD_1$ is the input resistor to operational amplifier 103. Therefore, in the position shown, the feedback resistance is equal to the input resistance and the amplifier has unity gain. With ganged switch sections in second or third positions connected to terminals $B_2$ through $B_6$ or $C_2$ through $C_6$, respectively, operational amplifier 103 is provided with feedback through $RSTD_2$ and the resistance of potentiometer RS between junction point 15 and tap TS and the input resistance is $RSTD_1$ in series with the potentiometer resistance between junction 13 and tap TS. When RS is set with tap TS in center position, the feedback resistance is equal to the input resistance and amplifier 103 has unity gain.

With ganged switch sections $SW_1$ through $SW_6$ in fourth position connected to terminals $D_1$ through $D_6$, $RSTD_2$ is switched out of the feedback path of amplifier 103 and a variable feedback is provided through potentiometer RS. The input resistor to operational amplifier 103 is then $R_8$ or $R_9$ depending on the position of $SW_7$. The usefulness of the four switch positions will become more fully apparent hereinafter.

Potentiometer $R_S$ is provided with a skirted knob having a double scale thereon which will be described hereinafter with reference to FIG. 2.

Operational amplifier 103 generates an output voltage $V_i$ which is applied through resistor $R_4$ to the input of operational amplifier 104, which with resistors $R_{01}$, $R_{02}$, $R_{03}$ and $R_{04}$, provides memory standard means. Memory standard variable resistors $R_{02}$, $R_{03}$, and $R_{04}$ may comprise interchangeable plug-in modules having characteristics in accordance with the calibration function desired. Operational amplifier 104 generates a voltage output equal to $V_i$ multiplied by the gain of amplifier 104 in accordance with the values of $R_{01}$, $R_{02}$, $R_{03}$, and $R_{04}$ which are selectively connected as described above in accordance with the position of the cylindrical filter wheel 108.

The voltage $V_{0i}$, (where $i = 1, 2, 3, 4$) at the output of amplifier 104 corresponding to resistor $R_{0i}$ is applied through resistor $R_5$ to voltage comparator 105 where it is compared to reference voltage $V_m$ applied to voltage comparator 105 through resistor $R_7$. A null detector 106 is provided to indicate when voltage $V_{0i}$ and $V_m$ are equal. In a preferred embodiment null detector 106 may include two oppositely poled light emitting diodes connected in parallel at the output of the voltage comparator, whereby when the two voltages $V_{0i}$ and $V_m$ are equal no current will flow through either diode and no light will be emitted.

The detector circuit of FIG. 1 may be fabricated from commercially available components. For example: amplifiers 102, 103, and 104, and comparator 105 may be operational amplifiers Model No. SN72747N, dual 741 manufactured by Texas Instrument; amplifier 101 may be a precision operational amplifier Model No. U6A777393 manufactured by Fairchild; null detector 106 may be Model No. HP5082, MINI-LED, manufactured by Hewlett Packard; and photodetector 107 may be a photomultiplier Model 931VA manufactured by RCA. It should be understood that the above components are offered only by way of example and that other components may be used without departing from the spirit and scope of this invention.

Figure 2:
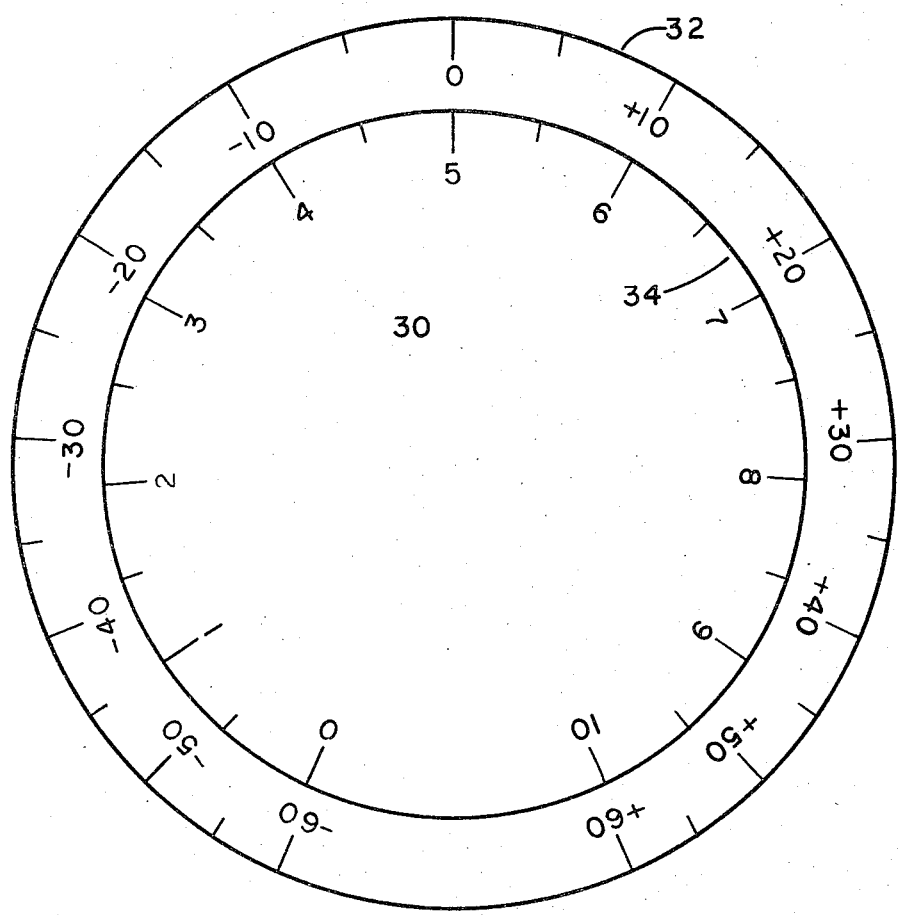
FIG. 2 is an enlarged view of the skirt of a potentiometer skirted knob for use in the system of FIG. 1.

Referring to FIG. 2 there is shown an enlarged view of the skirt or dial 30 of potentiometer RS of FIG. 1. Dial 30 is provided with two scales thereon. A first density scale 32 is calibrated in accordance with standard filter densities to indicate the proper filters which are necessary to obtain color balance in the color printing process. A second scale 34 is calibrated to indicate the proper exposure time for printing the color negative.

Referring to FIG. 1, the device is calibrated for density measurements as follows. A standard photographic color negative is inserted in the negative holder 112 and color compensating filters (referred to as the standard filter pack) which provides a good color print, are placed in the filter drawer 113 located adjacent to the condenser lens 114. White light from the source 115, transmitted through a spectrally neutral area of the standard color negative and standard filter pack, is focused by the objective lens 110 on the probe 109, is guided through the light guide 117 and thence through a circular opening in the instrument case. The guided light is incident on primary color filters or a neutral density filter which cover apertures on the surface of the cylinder 108. The cylinder is coupled to the shaft of the selector switch. The filtered light is incident on the photocathode of the photodetector 107. The photo-current $I_i = I_i^{ref}$, amplified by voltage amplifier 101 and operational amplifiers 102 and 103, generates voltage $V_i = V_i^{ref}$ at the output of the operational amplifier 103 (where $i = 1, 2$, and 3 correspond to red, green and blue selecting filters respectively and $i = 4$ corresponds to the neutral density filter). Voltage $V_i^{ref}$ is proportional to the product of $I_i^{ref}$ and the corresponding gain of the operational amplifier 103 and is therefore proportional to the intensity of the primary color incident on the photodetector. The gain of the operational amplifier 103, with ganged selector switch connected to terminals designated as B and C is $$G_i = (R_T/2 \pm R_{si} + \text{RSTD})/(R_T/2 \mp R_{si} + \text{RSTD}),$$

(where $i = 2, 3$), $R_T$ is the end resistance of the calibrated potentiometer designated as $RS$, $\pm R_{si}$ is the change of resistance of the potentiometer measured to the tap TS relative to $R_T/2$ and RSTD corresponds to the common resistance value of $RSTD_1$ and $RSTD_2$ which determines the upper and lower limits of density. The potentiometer is calibrated so that its scale reading is given by $$D_i^S = \text{Log}_{10}(1/G_i) \quad G_i < 1$$

(1a)

and $$D_i^S = -\text{Log}_{10}(G_i) \quad G_i > 1$$

(1b)

and therefore for $R_{si} = 0$, $D_i^S = 0$.

The gain of operational amplifier 104 is determined by the ratio $R_{oi}/R_4$ (where $i = 1, 2, 3, 4$) when the selector switch connects terminals A, B, C, or D respectively. The voltage $V_{oi}$ at the output of operational amplifier 104 is applied to the input of the voltage comparator 105 along with reference voltage $V_m$ and the output of the voltage comparator is connected to the null detector 106. $R_{01}$ is switched in with its corresponding filter by selector switch sections connected to A terminals, for which case the operational amplifier has unity gain. Sensitivity control, potentiometer $R_2$ is adjusted until a null indication is observed by null detector 106. For $I_i = I_i^{ref}$ and $V_i = V_i^{ref}$, $R_{si}$ is set equal to zero (where $i = 2, 3$), corresponding to $D_i^S = 0$. $R_{02}$ and $R_{03}$ and their corresponding filters are selected by the selector switch with switch sections connected to B and C terminals, respectively. $R_{02}$ and $R_{03}$ are adjusted individually to obtain a null indication. This establishes memory voltages wherein whenever $V_i = V_i^{ref}$ a null indication is obtained. Thus, the memory voltage $V_i^{ref}$ is proportional to the intensity of the corresponding primary color transmitted through the standard filter pack and spectrally neutral area of the standard negative.

To determine the proper compensating filter densities for printing a color negative, the negative is inserted in the negative holder and measurements are made with no compensating filters in the filter drawer. The red selecting filter is selected by selector switch in A position in which case the gain of operational amplifier 103 is unity or $G_1 = 1$. The gain of amplifier 102 is adjusted by the sensitivity control $R_2$ or the light intensity incident on the photodetector is varied by adjustment of the aperture 111 so that $V_1 = V_1^{ref}$ as indicated by the null detector.

A null indication is then obtained for the blue and green filters by adjustment of $R_S$ with the selector switch in the B and C positions, respectively, and then $$V_i = V_i^{ref} \quad (i=1, 2, 3) \tag{2}$$

The voltage $V_i^{ref}$ and $V_i$ are related to the light intensity, optical transmission and sensitivities by the equations, $$V_i^{ref} = CIT_i^{ref}T_ik_iS^{ref}/(N^{ref})^2 \tag{3}$$

and $$V_i = CIT_iT_ik_iSG_i/N^2, \tag{3a}$$

where $C$ is a constant, $I$ the intensity of the white light source, $T_i$ is the optical transmission through the spectrally neutral area of the color negative to be printed, $T_i^{ref}$ is the optical transmission through the standard filter pack and spectrally neutral area of the standard negative, $k_i$ is the spectral sensitivity of the photodetector, $T_i$ is the optical transmission through the color selecting filter, $S^{ref}$ and $S$ are the gains of operational amplifier 102 and $N^{ref}$ and $N$ are the $f$/numbers utilized for measurements of the standard and measured negative, respectively.

The condition for a null is from Eqs. (2), (3) and (3a), accordingly $$G_i = (T_i/T_i^{ref})(S^{ref}/S)(N/N^{ref})^2. \tag{4}$$

The necessary condition to obtain a color balance for the negative to be printed is, $$I_1/I_1^{ref} = I_2/I_2^{ref} = I_3/I_3^{ref} \tag{5}$$

where $I_i$ is the primary color intensity of light transmitted through the spectrally neutral area of the color negative to be printed and $I_i^{ref}$ is the primary color intensity of light transmitted through the standard filter pack and spectrally neutral area of the standard color negative. Since $I_i = T_iT_iI$ and $I_i^{ref} = T_iT_i^{ref}I^{ref}$, the condition for color balance in accordance with Eq. (5) becomes, $$T_1/T_1^{ref} = T_2/T_2^{ref} = T_3/T_3^{ref} \tag{6}$$

Two cases are considered for determining the optical density correction for the green absorbing filter:

A. If $T_1/T_1^{ref} < T_2/T_2^{ref}$ ($G_2 < 1$ from Eq. (4)), then a compensating filter of optical density $D_2^F$ and optical transmission $T_2^F$ must be added in order that $$T_2T_2^F/T_2^{ref} = T_1/T_1^{ref} \tag{7}$$

or since the optical density $D_i$ is equal to $\text{Log}_{10}(1/T_i)$, $$D_2^F = D_2^{ref} - D_2 + D_1 - D_1^{ref} \tag{8}$$

B. If $T_1/T_1^{ref} > T_2/T_2^{ref}$ ($G_2 > 1$ from Eq. 4)), then a compensating filter of optical density $D_2^F$ and optical transmission $T_2^F$ must be subtracted such that $$T_2/T_2^{ref}T_2^F = T_1/T_1^{ref} \tag{9}$$

or, $$D_2^F = D_2 - D_2^{ref} + D_1^{ref} - D_1. \tag{10}$$

$G_1 = 1$ for the red balance condition and therefore, from Eqs. (1) and (4), $$D_1^s = 0 = D_1 - D_1^{ref} + \text{Log}_{10}((N/N^{ref})^2(S_{ref}/S)) \tag{11a}$$

or $$\text{Log}_{10}((N/N^{ref})^2(S^{ref}/S)) = D_1^{ref} - D_1 \tag{11b}$$

The null condition for the measured negative in the case of the green absorbing filter is obtained when $R_{s2}$ is adjusted so that Eq. (4) is satisfied and then for the two cases previously considered:

A. $G_2 < 1$, $$D_2^s = \text{Log}_{10}(1/G_2) = D_2^{ref} - D_2 - \text{Log}_{10}((N/N^{ref})^2(S^{ref}/S))$$

(12)

from Eqs. (1) and (4). Substituting Eq. (11b) into Eq. (12), $$D_2^s = D_2^{ref} - D_2 + D_1 - D_1^{ref}.$$

(13)

Thus, Eq. (13) shows that in accordance with Eq. (8), the scale reads the optical density of the green absorbing compensating filter to be added for a color balance of the measured negative.

B. $G_2 > 1$, $$D_2^s = \text{Log}_{10}(G_2) = D_2 - D_2^{ref} + D_1^{ref} - D_1,$$

(14)

from Eqs. (1), (4) and (11b). Thus Eq. (14) shows that in accordance with Eq. (10), the scale reads the optical density of the green absorbing compensating filter to be subtracted for a color balance of the measured negative.

The same procedure is used to determine the optical density of the filter $D_3^F$ to add or subtract for the blue absorbing filter.

Referring to FIG. 1, the device is calibrated for exposure time as follows. The ganged selector switch is turned to position D selecting the neutral density filter on filter wheel 108. A standard photographic color negative is inserted in the negative holder 112 and the standard filter pack is placed in the filter drawer 113. White light from source 115, transmitted through a highlight of the standard color negative and filter pack, focused by the objective lens 110 on the probe 109, is guided through the light guide 117 through the neutral density filter on the filter wheel 108. The filter light is incident on the photodetector 107. The resulting photodetector current, $I_4 = I_4^{ref}$, proportional to the intensity of light incident on the photodetector, after amplification by voltage amplifier 103 and operational amplifiers 102 and 103 generate voltage $V_4 = V_4^{ref}$ at the output of operational amplifier 103 which is proportional to $I_4^{ref}$. A second scale $t^s$ of the calibrated potentiometer $R_S$ is calibrated so that $t^s = KR_S/R_8$ corresponds to exposure time. $R_9$ is equal to $R_8/10$, so when switch SW7 is in the position B7, the time scale corresponding to that calibrated for $R_8$ is multiplied by 10. The scale of $R_s$ is rotated so that $t^s$ corresponds to the proper exposure time for the standard color negative. Voltage $V_4^{ref}$ is applied to the input of operational amplifier 104, the output of which is applied to the voltage comparator 105 along with the reference voltage $V_m$ and $R_{04}$ varied until a null indication is obtained by null detector 106 in which case, $V_4 = V_4^{ref}$ is the requirement for a null indication. In general, $$I_4 RS = KV_4,$$

(15)

where $K$ is a constant. When a null indication is obtained for the standard color negative, $$I_4^{ref} RS^{ref} = KV_4^{ref}.$$

(16)

To measure the exposure time for a color negative to be printed, the standard color negative is replaced by the negative to be printed and the standard filter pack replaced by the compensating filters determined by the method described above and light through a highlight of the negative is incident through the neutral density filter on the photodetector.

The potentiometer $RS$ is adjusted until a null indication is obtained. Then $V_4 = V_4^{ref}$ and by Eq. (15), $$I_4 RS = KV_4^{ref}.$$

(17)

Therefore, from Eq. (16), $$I_4 R_s = I_4^{ref} RS^{ref}$$

(18)

Since $I_4$ and $I_4^{ref}$ are proportional to the intensities of light $I_4$ and $I_4^{ref}$ through the measured and standard negative and their respective compensating filters and $RS$ and $RS^{ref}$ are proportional to $t_2$ and $t^{ref}$ where $t_s$ is the exposure time on the scale of the calibrated potentiometer $RS$ and $t^{ref}$ is the exposure time for the standard negative, Eq. (18) may alternatively be stated as, $$I_4 t^s = I_4^{ref} t^{ref}$$

(19)

Therefore, for $t^s$ equal to the exposure time for the measured negative, Eq. (19) shows that in this case the exposure for the measured negative is equal to the exposure for the standard color negative, which is the requirement for producing the correct print density.

What is claimed and desired to be secured by Letters Patent:

1. A photometric device for determining the difference in optical density between a standard optical absorber and an unknown optical absorber comprising:

a light source for generating light of a particular intensity incident on an optical absorber;

optical coupling means for directing said generated light through said optical absorber;

selectable primary color filter means disposed in the optical path of light transmitted through said optical absorber;

detector means for collecting light transmitted through said optical absorber and said selectable primary color filter means, said detector means providing a detector current proportional to the intensity of the selected spectral component of said transmitted light;

voltage generating means coupled to said detector means for producing a voltage proportional to said detector current;

a first operational amplifier means and associated variable feedback resistive means coupled to said voltage generating means, producing a voltage proportional to said detector current and wherein the gain of said first operational amplifier is adjustable by said variable feedback resistive means;

a second operational amplifier means and associated feedback potentiometer means coupled to said first operational amplifier means for providing an adjustable resistive ratio and corresponding amplifier gain in inverse proportion to the intensity of each of the said individual spectral components of said transmitted light incident on said detector means corresponding to selectable color reference voltages generated by said second operational amplifier means for each of said individual spectral components of said incident light on said detector means;

density calibration means coupled to said potentiometer means for displaying said difference in optical density;

memory standard means coupled to said second operational amplifier means comprising a third operational amplifier means with selectable variable feedback resistive means and associated gain establishing said selectable color reference voltages wherein each selectable voltage corresponds to the intensity of light transmitted through said standard optical absorber and one of said selected primary color filters;

voltage comparing means coupled to said third operational amplifier means and to a fixed voltage means;

null detecting means coupled to said voltage comparing means providing an indication when said fixed voltage is equal to the voltage generated by said third operational amplifier.

2. The device as claimed in claim 1 wherein said selectable primary color filters are mounted on a cylinder coupled to a ganged memory selector switch.

3. The device as claimed in claim 1 wherein said detector means is a photomultiplier tube.

4. The device as claimed in claim 1 wherein said voltage generating means provides a low input impedance for said detector means and further provides means by which the gain of said voltage generating means can be adjusted so that the voltage of said voltage generating means remains constant for a given light level regardless of the sensitivity of the selected said detector means and further comprises voltage divider means wherein offset voltages of said voltage generating means and dark current of said detector means can be balanced to zero.

5. The device as claimed in claim 1 wherein said optical coupling means comprises an optical probe means disposed in the path of light transmitted through said optical absorber and fiber optic means between said probe means and said selectable primary color filters.

6. The device according to claim 1 wherein said means for indicating when said compared voltages are equal comprises a null detector including two oppositely poled parallel light emitting diodes which emit no light when a null is acheived.

7. A photometric device for determining the proper densities of a color compensating filter pack required to obtain color balance for a color negative to be printed and the proper exposure time for printing said negative comprising:

a. a light source and optical coupling means for generating light of a predetermined intensity along a predetermined optical path;

b. means for supporting a color compensating filter pack in the optical path of said light source;

c. means for supporting a color negative in said optical path;

d. selectable filter means supported in said optical path for passing selected spectral components of light generated by said light source, at least one of said selectable filters being a neutral filter which passes all of said spectral components;

e. detector means for generating a detector current proportional to the intensity of said selected spectral components of light generated by said source;

f. voltage generating means coupled to said detector means for producing voltages proportional to said detector current;

g. a first and second operational amplifier means and associated variable feedback resistive means coupled to said voltage generating means for producing color representative voltages proportional to said detector current for said selected spectral components to said detector current;

h. memory standard means comprising a third operational amplifier means and associated variable feedback resistive means coupled to said second operational amplifier for establishing selectable color reference voltages corresponding to said color representative voltages generated by selected spectral components of light which have passed through a spectrally neutral area of a standard color negative and a standard filter pack disposed in said optical path, wherein for a specified color component, the gain of said second and third operational amplifier means are adjusted to unity by selection of fixed feedback resistive means and said color reference voltage corresponding to said specified color component established by adjusting the gain of said first operational amplifier means by said associated variable feedback resistive means and said remaining color reference voltages established by adjusting said second operational amplifier gain to unity by said variable resistive feedback means and adjusting the gain of said third operational amplifier by said selectable resistive means for each of the remaining said spectral components, said memory standard means further including means for establishing an exposure reference voltage wherein the gain of said first operational amplifier is adjusted to unity by selection of a fixed feedback resistive means and the gain of said second operational amplifier adjusted to a specific value by said associated feedback resistive means;

i. voltage comparing means coupled to a fixed voltage and said memory standard means for determining when said color and exposure representative voltages are equal to said color reference voltages and exposure reference voltage respectively;

j. means for indicating when the compared voltages are equal;

k. means for adjusting said color representative voltages and said exposure representative voltage to values equal to said color reference voltages and said exposure reference voltage, respectively, said color representative voltage corresponding to said specified color component being adjusted by said variable feedback resistive means associated with said first operational amplifier means and wherein the remaining said color representative voltages being adjusted by said variable feedback resistive means associated with said second operational amplifier means and wherein a fixed feedback resistive means associated with said first operational amplifier corresponding to unity gain being selected and said exposure representative voltage being adjusted to equal said exposure reference voltage by said variable feedback resistive means associated with said second operational amplifier means, said color representative voltages and exposure representative voltage being adjusted for each selected spectral component with the standard filter pack removed from said optical path and the light from said source passing through a spectrally neutral area of the color negative to be printed, said exposure representative voltage being adjusted with said generated light passing through a highlight of the color negative to be printed, said proper compensating filter pack, and said neutral selectable filter, said adjusting means including scales for indicating the densities of said proper compensating filter pack required to obtain color balance for the color negative to be printed and the proper exposure time for printing said negative.

8. The device according to claim 7 wherein said voltage generating means provides a low input impedance for said detector means and further provides means by which the gain of said voltage generating means can be adjusted so that the voltage of said voltage generating means remains constant for a given light level regardless of the sensitivity of the selected said detector means and further comprises voltage divider means wherein offset voltages of said voltage generating means and dark current of said detector means can be balanced to zero.

9. The device according to claim 7 wherein said selectable filters are mounted on a cylindrical filter wheel coupled to a ganged memory selector switch in said memory standard means.

10. The device according to claim 9 wherein said selectable filters comprise red, green, blue, and neutral filters.

11. The device according to claim 7 wherein said detector means is a photomultiplier tube.

12. The device according to claim 7 wherein said optical coupling means comprises an optical probe means disposed in the path of light transmitted through a color negative and compensating filter pack and fiber optics means between said probe means and said selectable primary color filters or said neutral filter.

13. The device according to claim 9 wherein said detector means is a photodetector disposed within said cylindrical filter wheel.

14. The device according to claim 7 wherein said voltage generating means comprises means coupled to said detector means for producing a voltage proportional to said detector current, a first operational amplifier means and associated variable feedback resistive means for amplifying said proportional voltage, and second operational amplifier means, said means for adjusting said color and exposure representative voltages including potentiometer means in the feedback path of said second operational amplifier means coupled to said first operational amplifier means wherein said potentiometer means provides a resistive ratio in inverse proportion to the intensity of the individual spectral components of the light incident on said detector means corresponding to said color reference voltages and said exposure reference voltage generated by said second operational amplifier means.

15. The invention defined in claim 14, wherein said memory standard means is coupled to said second operational amplifier means and comprises a third operational amplifier with selectable variable feedback resistors establishing selectable reference voltages, said reference voltages corresponding, respectively, to the intensity of light transmitted through said standard optical absorber standard color negative and corresponding filter pack and a respective one of said selected primary color filters or neutral filter.

16. The device according to claim 14 wherein said potentiometer means includes two scales thereon, one of said scales being calibrated to indicate the densities of said proper compensating filter pack and the other of said scales being calibrated to indicate said proper exposure time.

17. The device according to claim 15 wherein said potentiometer means includes two scales thereon, one of said scales being calibrated to indicate the densities of said proper compensating filter pack and the other of said scales being calibrated to indicate said proper exposure time or multiple thereof as determined by a selectable means.

18. The device according to claim 7 wherein said means for indicating when said compared voltages are equal comprises a null detector including two oppositey poled parallel light emitting diodes with legends thereon which emit no light when a null is acheived wherein said legends indicate whether said compensating filtration should be added or subtracted.

19. The device according to claim 14 wherein said variable resistive means of said first operational amplifier comprises calibration means for said memory standard means.

20. The device according to claim 7 wherein an adjustable aperture means is provided in said optical path for varying the intensity of light transmitted to said detector means, said adjustable aperture means comprising a calibration means for said memory standard means.

21. The device of claim 7 wherein said memory standard means comprises interchangeable plug-in modules.

* * * * *